(12) United States Patent
Paeschke et al.

(10) Patent No.: US 8,302,870 B2
(45) Date of Patent: Nov. 6, 2012

(54) PERSONAL DOCUMENT AND METHOD FOR PRODUCING IT

(75) Inventors: Manfred Paeschke, Basdorf (DE); Malte Pflughoefft, Berlin (DE); Joerg Fischer, Berlin (DE); Guenter Beyer-Meklenburg, Neuruppin (DE); Oliver Muth, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 526 days.

(21) Appl. No.: 12/448,189

(22) PCT Filed: Dec. 11, 2007

(86) PCT No.: PCT/EP2007/063697
§ 371 (c)(1),
(2), (4) Date: Oct. 27, 2009

(87) PCT Pub. No.: WO2008/071697
PCT Pub. Date: Jun. 19, 2008

(65) Prior Publication Data
US 2010/0051702 A1    Mar. 4, 2010

(30) Foreign Application Priority Data
Dec. 15, 2006  (DE) .................. 10 2006 059 454

(51) Int. Cl.
*G06K 5/00*    (2006.01)
*G06K 19/02*   (2006.01)
*G06K 19/06*   (2006.01)

(52) U.S. Cl. .................. 235/492; 235/380; 235/488

(58) Field of Classification Search .................. 235/380, 235/492, 488; 257/40, 679; 361/633; 702/188
See application file for complete search history.

(56) References Cited

U.S. PATENT DOCUMENTS

| | | | | |
|---|---|---|---|---|
| 5,272,596 | A * | 12/1993 | Honore et al. | 361/633 |
| 5,321,240 | A * | 6/1994 | Takahira | 235/492 |
| 5,671,525 | A * | 9/1997 | Fidalgo | 235/492 |
| 6,170,880 | B1 * | 1/2001 | Prancz | 235/492 |
| 6,288,443 | B1 | 9/2001 | Finn et al. | |
| 6,712,279 | B2 * | 3/2004 | Muehlberger et al. | 235/492 |
| 6,828,360 | B2 | 12/2004 | Fukuda et al. | |
| 7,264,172 | B2 * | 9/2007 | Amiot et al. | 235/492 |
| 7,552,031 | B2 * | 6/2009 | Vock et al. | 702/188 |
| 7,777,317 | B2 * | 8/2010 | Wolny | 257/679 |
| 2004/0026689 | A1 * | 2/2004 | Bernds et al. | 257/40 |
| 2008/0169638 | A1 | 7/2008 | Beyer-Meklenburg et al. | |
| 2011/0114732 | A1 * | 5/2011 | Reignoux et al. | 235/488 |

FOREIGN PATENT DOCUMENTS

DE    196 30 648    2/1998
(Continued)

*Primary Examiner* — Thien T Mai
(74) *Attorney, Agent, or Firm* — Jordan and Hamburg LLP (57) ABSTRACT

The invention relates to a personal document that can be read contactlessly and which includes a laminate having a chip film and a chip, a substrate covering the chip film on the structure side of the chip and a covering layer covering the chip film on the rear side, the chip having an integrated circuit, said chip being thinned to the thickness defined herein. The personal document includes a polymeric carrier film that connects to the chip through a coupling reagent possessing functional groups compatible with functional groups of the semiconductor material of the chip and of the polymer carrier film layers of the chip film. Also, the chip is connected to an antenna provided on the substrate.

31 Claims, 7 Drawing Sheets

FOREIGN PATENT DOCUMENTS

| | | |
|---|---|---|
| DE | 196 51 566 | 6/1998 |
| DE | 197 16 342 | 10/1998 |
| DE | 10 2004 055 495 | 5/2006 |
| EP | 1 321 480 | 6/2003 |
| WO | WO-02/15264 | 2/2002 |
| WO | WO-2005/069204 | 7/2005 |
| WO | WO-2006/000849 | 1/2006 |

* cited by examiner

PERSONAL DOCUMENT AND METHOD FOR PRODUCING IT

BACKGROUND OF THE INVENTION

The invention relates to a personal document, such as a personal identification, passport, driver's license, or employee identification, and relates to a method for producing said personal document.

A number of applications are known from the prior art in which integrated circuits are incorporated in documents, for instance in the form of IC cards. These facilitate rapid, sometimes automated verification and make it more difficult to falsify such documents. Furthermore, additional data such as e.g. biometric data for authenticating the document's possessor can be stored in this manner.

However, the disadvantage of incorporating ICs in documents is that in many cases they must be very flexible and they are subjected to different and very heavy loads, in particular bending loads, during their period of validity. ICs based on silicon, however, are brittle and break easily, so that it is not always possible to assure the desired durability. Because of this, chips are normally embedded in the casting compound and incorporated in IC cards in this manner as "chip modules", but instead of being an integral component in the cards, they are foreign bodies whose mechanical properties are clearly different from the substrate material of the cards. In addition, the contacts between IC and conductor are particularly endangered when, while the document is being bent, the substrate bends but the IC remains rigid. This imposes very stringent limits in particular on the size of ICs in flexible documents.

In the past it has been possible to incorporate large and more powerful, thick ICs in non-flexible documents, for instance the passport covers, because the rigid cover protects the document and IC. In the case of chip cards, which are likewise relatively rigid, a thickness of at least 760 µm is necessary, but little space is left over for designing the card structure, due to the size of the chip module and its thickness of, for instance 35 µm. Finally, incorporating a chip renders the structure of the document less stable overall, making it vulnerable to manipulation by potential counterfeiters.

Known from the prior art (DE 196 51 566 B4) is abrading silicon ICs on their back side, thus making them thinner. Such ICs, which in extreme cases can be thinned down to 10 µm to 15 µm, are much more flexible than conventional thick chips so that they can even be incorporated, for instance, into thin documents that have paper as a base (DE 196 30 648 A1).

However, when incorporated into personal documents, even this type of IC still represents a foreign body in the document. These ICs bond only incompletely to the substrates that are normally used for personal documents, such as paper and plastics, in particular polycarbonate and polyethylene terephthalate. Because of this, it is possible to intentionally or even inadvertently separate the document from the IC; so that there is still a risk of technical failure and opportunities for manipulation. The object of the invention is to create a personal document that is improved in this regard.

SUMMARY OF THE INVENTION

This object is attained with a personal document having an integrated contactless chip that comprises a laminate that includes at least one chip film, a substrate covering the chip film on the structural side of the chip, and a cover layer covering the chip film on the back side. The chip film itself includes a chip that has been thinned to a thickness of $d \leq 50$ µm, preferably $\leq 30$ µm, particularly preferred is $d \leq 20$ µm, and that has an integrated circuit, and a polymer carrier film that, apart from contact connectors, is applied both to the structural side and to the back side of the chip, the chip being joined on both sides to the carrier film by a coupling reagent, the molecules of which have a first chemically functional group that preferably reacts with the semiconductor material of the chip surface and forms a covalent bond therewith, and possess a second functional group that preferably reacts with the polymer matrix of the carrier film. The chip is joined to an antenna provided on the substrate. The carrier film, the substrate, and the cover layer each have compatible polymers that are miscible with one another, in particular are soluble in one another.

Thus in the inventive personal document it is not a conventional chip module that contains a relatively thick chip that is used, that is embedded in a casting compound, and that thus forms a rigid foreign body in the document. On the contrary, the chip is added quasi-directly, which facilitates a better bond between document and chip, the materials of the document body taking on the functions that normally must be provided by the casting compound of the chip module. The term "chip film" indicates a semiconductor-structured silicon that is applied to polymer film and thinned so that all that remains on the semiconductor structure is a silicon protective layer of a few 10 µm. An inseparable bond is produced between chip and carrier film, and this bond is created by molecules that are covalently bound to the chip. This results in the advantage that mechanical loads, like those that occur e.g. from bending the document or from thermal expansion, are absorbed by the substrate material and the semiconductor structure is protected appropriately.

Another advantage is that if there is an attempt to manipulate the document, for instance to delaminate it, the chip film cannot be removed from the document without being damaged.

The polymers that are applied to the bottom and top of the chip should be compatible. This means that they are miscible with one another and in particular are soluble in one another. Because of this the polymers mix with one another during the lamination and form one uniform card body with the adjacent surfaces of the substrate and cover layer, which are also compatible. This is attained in the optimum manner when there are identical polymers. In one preferred embodiment, the polymer films that form the carrier film enclose the chip completely except for its contact locations.

It is advantageous when an additional layer that protects against light is incorporated above and below the chip in the document. It can be in the form of metallization, for instance a hologram patch, a color, or black in the film structure and the like. Thus it is possible to preclude photoelectric effects and assure proper functioning even when there is strong incident light. In addition this prevents intentional manipulation of the chip using light radiation.

In the inventive personal document, the compatible polymers are preferably selected from the group of thermoplastics, in particular polycarbonates (PC) and polyethylene terephthalates (PET), including their derivatives.

In the inventive personal document, preferably polymer films are used that are biaxially oriented and do not build up any appreciable tensions that could damage the IC. In particular the layers can be built up such that the contractions caused by the molecular orientation and the thermal expansions of the polymer layers are mutually compensating.

The chip for the inventive personal document is joined to an antenna, which is in or on the substrate, so that it can be read contactlessly, the ends of conductors for the antenna, which are printed on the substrate, being joined to the chip and at least one conductor running in a plane below the chip or at least one conductor having an interruption at the location of the chip, the interruption being connected internally by the chip. This avoids having to have one end of the antenna crossing the conductors for contacting the chip.

Preferably a passivation layer, for instance made of silicon nitride, is provided between at least one side of the chip and the polymer carrier film, so that for instance good adhesion also results. In addition, an electrically conductive layer can be applied to the contact connectors, in particular up to the thickness of the polymer carrier film, which is formed for instance from an intrinsically conductive polymer, comprises a sinterable nanoscale metal powder, or comprises an adhesive with carbon nanotubes.

For compensating any intermediate spaces that remain with the antenna connectors, a filler structure is advantageously provided on the polymer surface of the substrate that is between the antenna connector surfaces and that is joined to the chip film during lamination.

The object is furthermore attained using a method for producing a personal document that has as an integral component a chip that has been thinned to a thickness $d \leq 50$ μm, preferably $d \leq 30$ μm, particularly preferred $d \leq 20$ μm, and that has the following method steps:

a) producing a chip film by joining the structural side and the back side of the thinned chip to a polymer carrier film by means of a coupling reagent, the molecules of which have a first chemical functional group that preferably reacts with the semiconductor material of the chip surface and forms a covalent bond therewith and possess a second functional group that preferably reacts with the polymer matrix of the carrier film;

b) applying the chip film to a substrate that is provided with an antenna structure and that is provided with a polymer compatible with the chip film;

c) joining the chip film to the substrate, with the antenna connectors contacting using pressure and temperature by means of lamination;

d) laminating a cover layer that is provided with a polymer compatible with the chip film.

Preferably, contact is established between chip and antenna, and the covalent bond between chip and polymer carrier film is formed by the close proximity with the effect of pressure and temperature during the course of the lamination process.

In another embodiment, an intermetal connection, an alloy that produces the contact based on a nanoscale connection technology, can be formed between the bond pads during lamination. This method is based on sintering nanoscale metal powder that is applied to the metal surfaces. The sintering occurs during document lamination due to the effect of heat and pressure. Materials for suitable metal powders are for instance silver, gold, copper, and aluminum.

In one refinement of the invention, an adhesive having CNTs (carbon nanotubes) is used that also improves tear resistance, in addition to producing the electrical contact. Anisotropic adhesives or ultrasonic bonding can be used as further contacting methods.

The method steps for producing the chip film and laminating it to the substrate can occur in separate work steps. However, the chemical joining of the chip to the carrier film using the coupling reagent is preferably performed concurrent with the lamination of the chip film to the substrate, the antenna connectors being contacted in the same work process.

In addition to increased security, stability, and durability, handling is thus also clearly improved during production, so that the costs for the personal document are reduced. The polymer carrier film can also be applied to the structural side of a final-tested wafer, thus acting as an adhesion and stabilization layer if the back side of the wafer is removed. Substrate materials are thermoplastics, in particular polycarbonate (PC), polyethylene terephthalate (PET), including its derivatives such as e.g. glycol-modified PET (PETG), polyethylene naphthalate (PEN), acrylonitrile-butadiene-styrene copolymer (ABS), polyvinyl chloride (PVC), polyvinyl butyral (PVB), polymethyl methacrylate (PMMA), polyimide (PI), polyvinyl alcohol (PVA), polystyrene (PS), polyvinyl phenol (PVP), polyethylene (PE), and polypropylene (PP). The substrate, which can be supported on paper, for instance, then has at least one surface layer made of one of these thermoplastic polymers or its derivatives, for instance in the form of a co-extruded substrate.

A polymer filler structure is preferably arranged in the intermediate spaces between the antenna connector surfaces prior to the chip film being applied so that there is complete contact between chip module and substrate at these locations. Even more advantageous measures can be undertaken for the same purpose. For instance, prior to the chip module being applied, a stamp and pressing process can be performed on the area of the substrate in which the chip module is to be positioned. In addition, prior to joining the chip module to the substrate, as described in the foregoing an electrically conductive material can be arranged on the electrical connectors of the chip so that contacting the chip module to the antenna connectors is easier and/or a passivation layer is applied for joining the carrier film to the chip.

In another embodiment, the inventive method is performed such that the chip film is produced by joining the structural side and the back side of the thinned chip to a polymer carrier film by means of a coupling reagent, the molecules of the coupling reagent again having a first chemically functional group that preferably reacts with the semiconductor material of the chip surface and there forming a covalent bond, and possessing a second functional group that preferably reacts with the polymer matrix of the carrier film. The chip film is applied to a substrate such that the chip back side faces the substrate, which is provided with a polymer that is compatible with the chip film. Once the chip film has been joined to the substrate using pressure and temperature by means of lamination, the antenna is applied, preferably using pressure, to the laminate produced in this manner. Finally the cover layer, which is also provided with a polymer compatible with the chip film, is applied by lamination.

Additional features and advantages of the invention result from the following description in connection with the figures.

BRIEF DESCRIPTION OF THE DRAWINGS

FIG. 7 a) depicts a substrate with a printed antenna;

b) depicts the substrate with the chip applied;

FIG. 8 a) depicts a second embodiment of the printed antenna;

b) depicts the second embodiment with the chip applied;

DETAILED DESCRIPTION OF THE INVENTION

Figure 1:
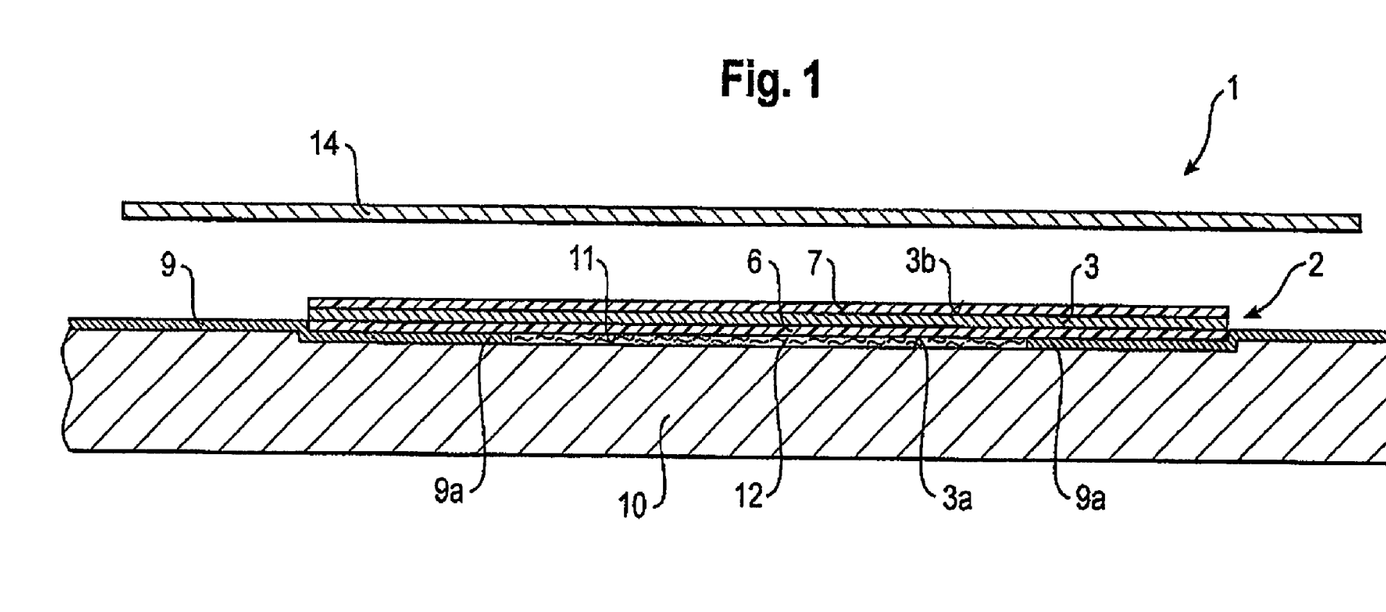
FIG. 1 provides a schematic depiction of the fundamental structure of an inventive personal document.

FIG. 1 provides a schematic depiction of the fundamental structure of the personal document 1 in a cross-section through the connector surfaces 9a of the antenna structure 9. The chip film 2 is applied with the structural side 3a of the chip 3, which has been thinned to a thickness of approx. 30 µm, to a substrate 10 that is based, for instance, on paper but has, at least on the side facing the chip film 2, a polymer surface 11 made of PC or PET. Applied to both sides of the thinned chip 3 is a polymer carrier film 6, 7 that is compatible with the polymer surface 11 of the substrate and joins essentially homogeneously during lamination. A polymer filler structure 12, also made of a compatible material, is arranged on the structural side of the chip between the antenna connector surfaces 9a. During lamination, the back side of the carrier film 7 joins with the cover layer 14, which for the sake of clarity is shown raised in FIG. 1.

Contacting of the chip and joining it to the substrate occurs using one of the aforesaid contacting options. Prior to lamination and contacting, a stamping work step is performed in the area of the substrate 10 in which the chip film 2 is to be positioned and which in the example shown includes areas of the antenna connector surfaces 9a on the polymer surface 11 of the substrate 10 and of the filler structure 12. In this manner a depression is created on the µm scale, and the chip fits into this depression.

After the stamping, application of the chip film 2, and its lamination to the substrate 10 with simultaneous contacting, the back side of the cover layer 14 is then laminated thereto. The chip film 2 and the corresponding layers of the substrate 10 and the cover layer 14 comprise compatible polymers that are soluble in one another and result in a union that cannot be separated without destroying the whole. The chip itself thus forms a mechanical, integral component of the document structure. Where necessary, the back side cover layer 14 can also be laminated in the same work step as the lamination of the chip film and substrate.

Figure 2:
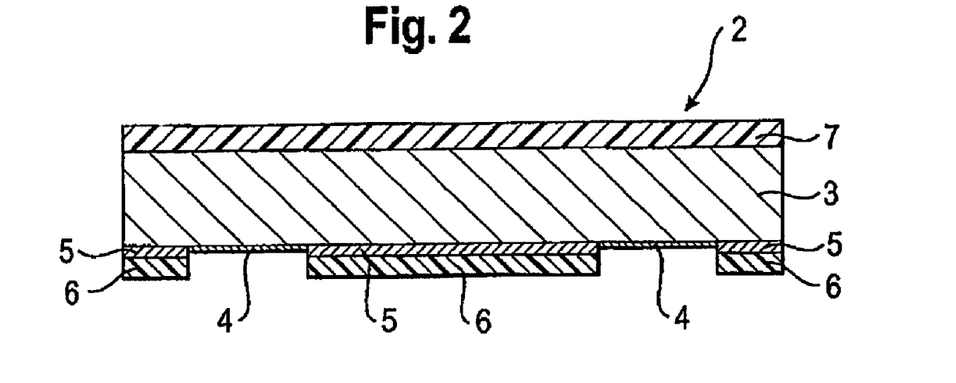
FIG. 2 depicts a chip film to be integrated in the personal document.

FIG. 2 depicts a chip film 2 to be incorporated in the personal document. Applied to the structural side of the thinned chip 3 is a passivation layer 5 made of silicon nitride, which layer itself is covered by a polymer carrier film 6 made of thermoplastic polycarbonate (PC). The carrier film 6 merely leaves the IC pad connectors 4 exposed. Although due to the arrangement of the thermoplastic PC layer 6 on the passivation layer 5 it is not possible to use a soldering process, comparatively cold contacting on the substrate is possible by means of the contacting method that has already been described. When the chip film 2 is laminated to the substrate, the electrical contact is completed, and a mechanical assembly is also completed. A most extensive bond results from a substrate having a polymer surface that also comprises PC.

The back side of the chip is also covered with a polymer carrier film 7 that for instance can be embodied in the same manner as on the structural side. This layer 7 improves the mechanical stability of the flexible thin chip film 2 and its handling, and it also effects improved energy coupling for instance with ultrasound-supported contacting. The back side-polymer layer 7 can be embodied such that it extends beyond the edge of the chip 3 and is joined to the front side-carrier film 6 so that the carrier film completely encloses the thinned chip 3.

Figure 3:
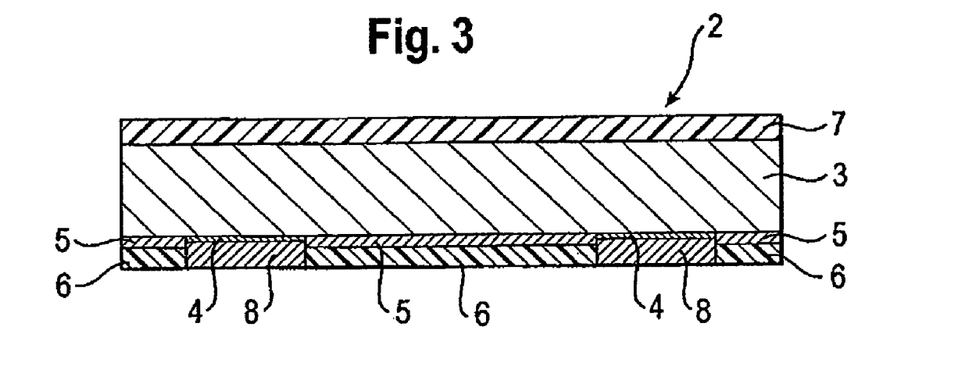
FIG. 3 depicts a chip film having an electrically conductive layer on the IC pad connectors.

FIG. 3 depicts another embodiment of the chip film 2. The carrier film 6, 7 of the thinned chip 3 is embodied as described in the foregoing for FIG. 2. An electrically conductive layer 8 is additionally arranged on the IC pads 4, the electrical connectors for the IC. This conductive layer 8 can be produced for instance from metal by means of chemical or galvanic processes. It is preferably embodied only to the height of the polymer coating 6. Where necessary, the thickness of the electrically conductive material 8 can also be selected to be less that that of the polymer layer 6. It can also be formed for instance by electrically conductive polymer systems and can be applied by means of dispenser, screen printing, ink-jet, or template. In addition to intrinsically conductive layer systems, those in which electrically conductive particles are embedded in a polymer matrix can also be considered as electrically conductive polymers. These include in particular nanoscales particles, it being possible to increase the conductivity with the same amount of filler using a suitable mixture of different particle geometries. In particular adding CNTs (carbon nanotubes) or MWCNTs (multi-walled carbon nanotubes) can produce adequate conductivity at low concentrations while also significantly reducing sensitivity to stress cracking.

Figure 4:
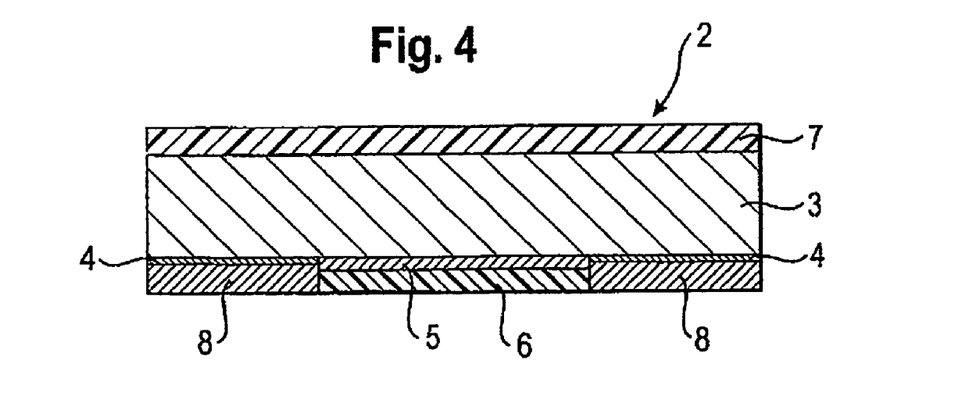
FIG. 4 depicts another embodiment of the chip film.

FIG. 4 also depicts a thinned chip 3 in which, compared to the example in FIG. 3, the IC pad connectors run up to the chip edges. The reference numbers identify the same components as in the previous figures.

Figure 5:
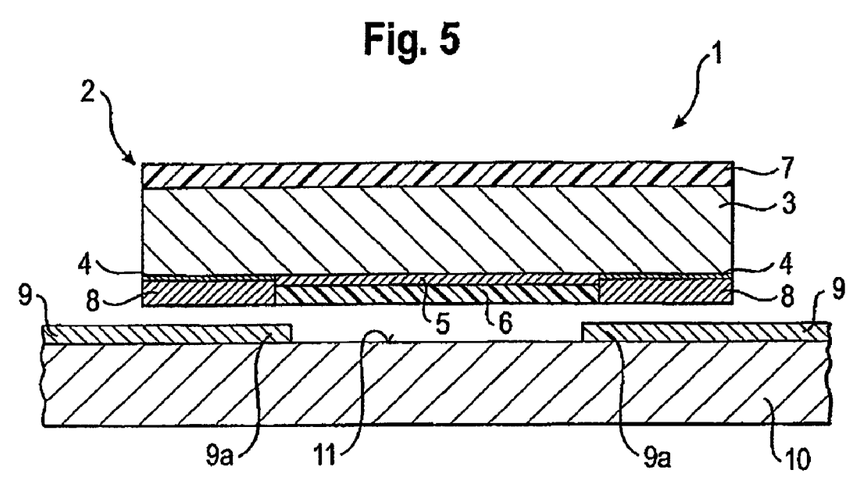
FIG. 5 is a schematic depiction of the chip film being applied to the substrate.

FIG. 5 provides a schematic depiction of the chip film 2 being applied to the substrate 10 of the personal document 1. The chip module 2 having the thinned chip 3 depicted in FIG. 4 is used. The substrate 10, which is based on paper, possesses a polymer surface 11 formed by PC and on which surface the antenna 9 having the connector surfaces 9a is arranged. As in the previous figures, the vertical extent is significantly exaggerated compared to the lateral dimensions. In fact, the thickness of thinned chips is less than 50 µm and can even be less than 30 µm or 20 µm. The thicknesses for the IC pad connectors 4 and the passivation layer 5 are in the sub-micrometer range, and the thicknesses of the polymer film 6 and the electrically conductive support 8 are typically a few µm to about 10 µm. The thickness of the antenna connector surfaces 9a on the substrate 10, 11 is in the range of several µm to about 15 µm, a polymer printed antenna structure 9 based on silver pastes being used that does not reach the 3Ω to 10Ω for an ISO 14443 A/B coil that is necessary for contactless communication until after a lamination process and temperature/pressure treatment at 130° to 200° and surface pressing of 300 N/cm$^2$ to about 550 N/cm$^2$. It is possible to produce the antenna in ways other than using pressure. It can also be placed as a wire, etched, vapor deposited, or transferred using transfer technology.

If the antenna connector surfaces 9a have the appropriate geometric configuration and if there is suitable pressure, where necessary with ultrasound support, the electrically conductive surfaces 8, 9a and also the layers 6, 11, which are insulating, are joined to one another during the lamination.

Figure 6:
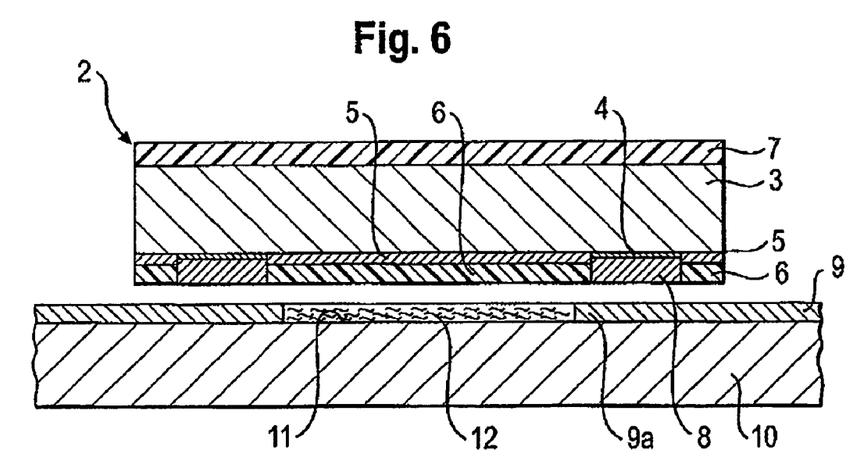
FIG. 6 depicts the chip film being applied with a polymer filler structure between the antenna connector surfaces.

FIG. 6 depicts another embodiment of the inventive personal document 1. The figure depicts the document schematically in section in a non-contacting condition, an additional polymer structure 12 being arranged on the surface 11 of the substrate 10 in the intermediate area of the antenna connector surfaces 9a compared to the embodiment described in the foregoing. The filler structure 12 joins to the carrier film 6 when the chip film 2 is laminated and leads to a smaller pressure load on the chip 3.

Figure 7A:
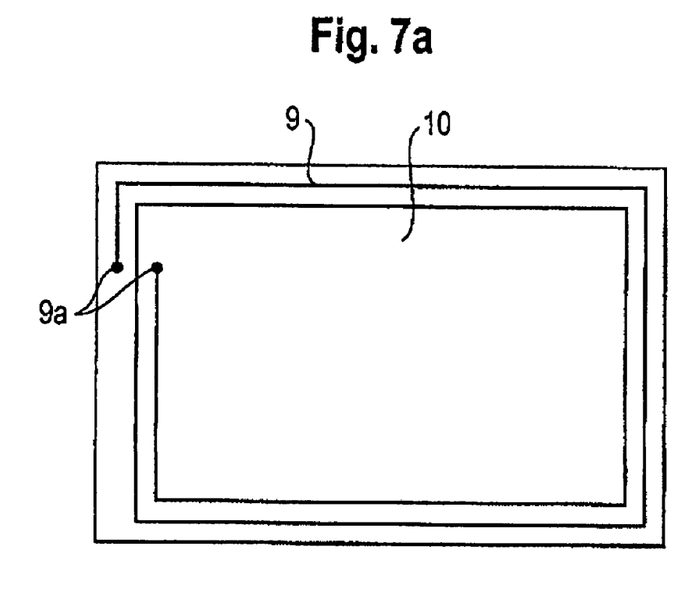
Figure 7B:
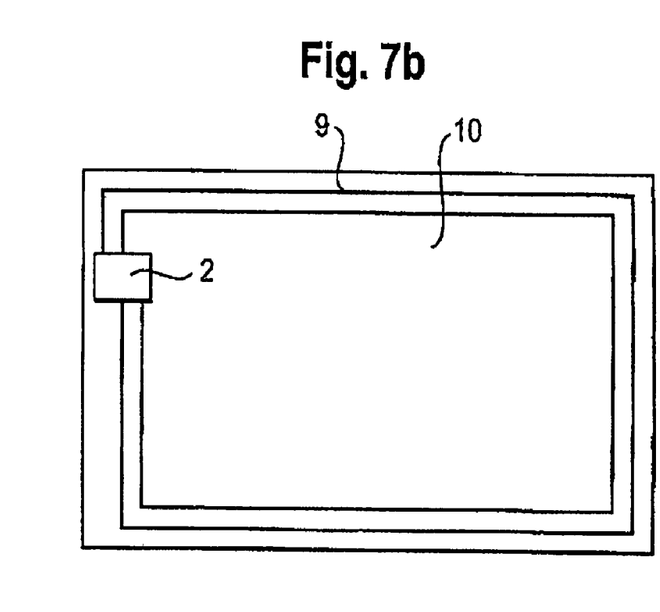

FIG. 7a depicts a substrate 10 having an antenna 9 that is pressed in a spiral onto the edge of the substrate 10. As a simplification, only three windings are shown (not to scale). The conductor is produced first. In order to be able to contact the IC, normally one of the ends of the conductor is guided inward, it being necessary to apply an insulator first in order to prevent a short-circuit due to the conductors crossing one another. In the inventive personal document, two antenna connector surfaces 9a are produced as contacts from the conductor to the structural side of the IC, as shown in FIG. 7a. The chip film 2 having the thinned chip is then applied and bonded to this structure in accordance with FIG. 7b. The continuous conductor for the antenna 9 runs underneath the chip film 2. In this manner it is possible to save one method step when producing the personal document.

Figure 8A:
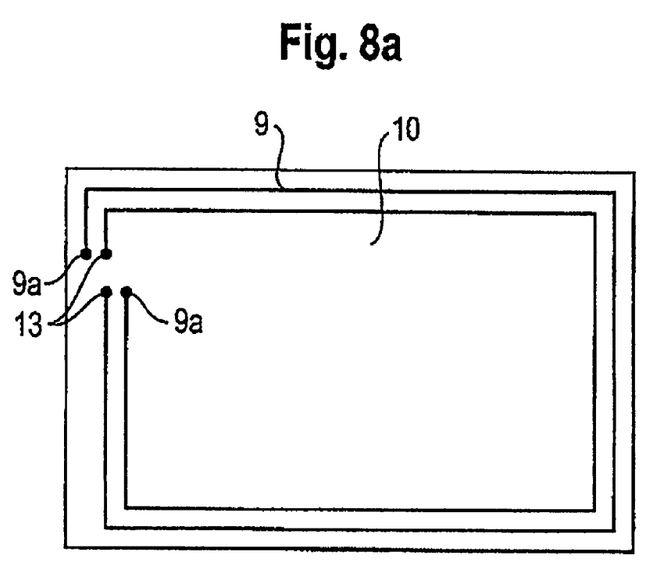
Figure 8B:
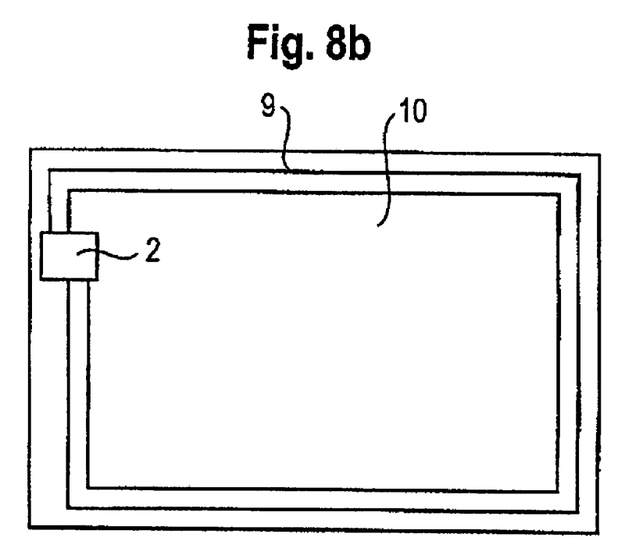

FIG. 8 depicts a second embodiment. In this case, the line connection for the conductor, which is interrupted at the additional contact points 13, is integrated into the chip module 2 so that it is not necessary to print a conductor below the chip. The disadvantage of having to provide additional contact points 13 is offset by the advantage of increasing the disruptive strength and reducing the risk of a short-circuit.

Recesses for the at least two contacts are provided in the polymer coating of the IC for connecting the RFID antenna. Contacting occurs in the course of lamination and thus does not require soldering, which normally entails a temperature load in the range greater than 240° and would require an appropriate substrate that could withstand the soldering.

Figure 9:
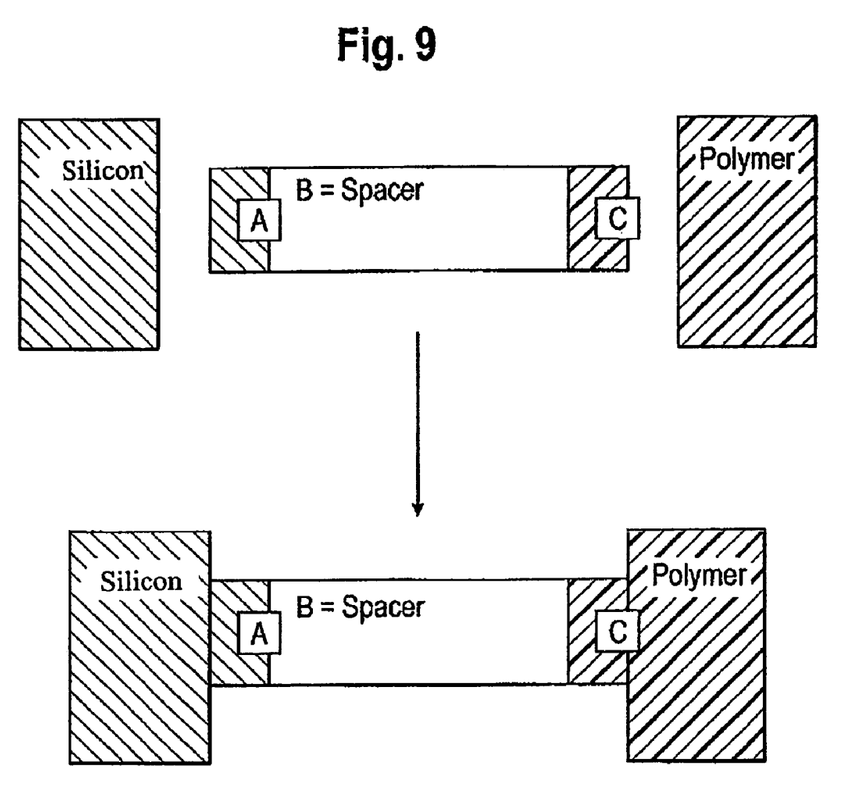
FIG. 9 depicts the scheme for joining the semiconductor and polymer matrix using a coupling reaction with a chemical bond.

FIG. 9 depicts the basic mechanism with which the silicon-based chip can be bonded to a polymer, in a manner such that the chip and polymer are practically inseparable, to create a chip film so that the chip ultimately can be incorporated as an integral component in a laminate bond. For this, a coupling reagent is required that can bond chemically both to the silicon of the chip and to the surrounding polymer matrix. Suitable, typically bifunctional molecules can typically be represented in general in the molecular components A-B-C, A being a chemically functional group that preferably reacts with the semiconductor material of the chip surface, B being a molecular spacer, and C being a chemically functional group that preferably reacts with the polymer. Thus it is essential that there are functional groupings within a molecule that selectively react with compatible chemical groups in the semiconductor or polymer matrix. Those molecules that satisfy this requirement are provided in Table I. All of them have a silane or alkoxysilane functionality A on one side. Moreover, they have spacer B and a functionality C that can selectively create a bond to the polymer. This is preferably a covalent bond. However, it can also be hydrogen bridge bonds or van der Waals bonds. The coupling reagent has the general formula $A_3SiB_nC$, it being possible to combine the functionalities A, B, and C as desired. There can also be a plurality of spacer groups B or functionalities A in one molecule, for instance in the form $A'A''A'''SiB'_nB''_mB'''_l$.

The polymers are preferably produced by means of living polymerization so that a link to the polymer chains results when there is contact with the reactive component C. In another embodiment, the coupling reagent can also intrinsically carry the catalyst for bonding to the polymer, as is the case in the example of the spacer group $(CH_2)_n$—NH— for base catalyzed reactions.

Figure 10:
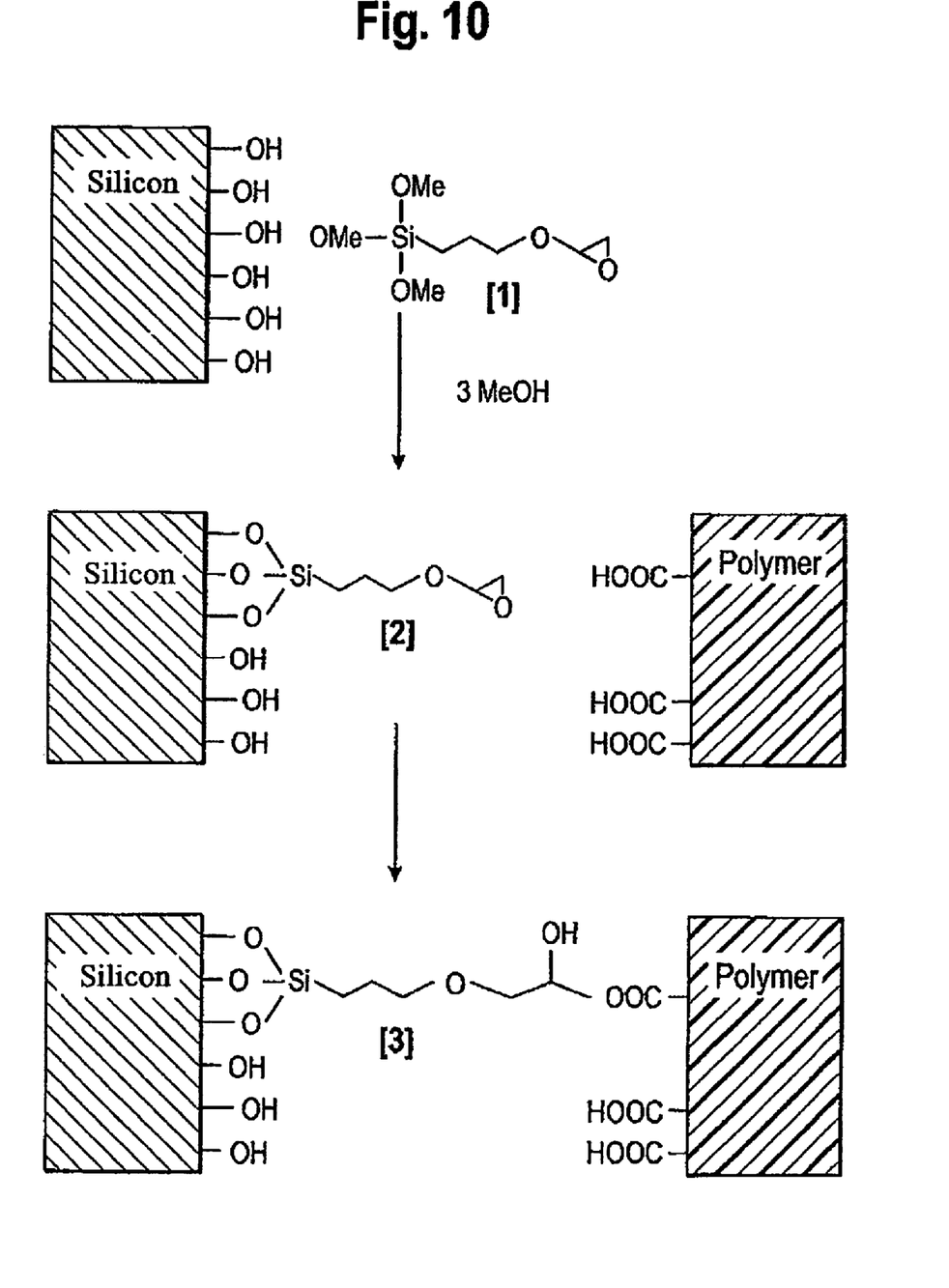
FIG. 10 depicts an exemplary coupling reaction.

FIG. 10 provides a specific example for a suitable coupling reaction. Semiconductors such as Si can be modified on the surface such that OH groups are available. The latter can react with a tri-methoxy-epoxy siloxane ([1] in FIG. 10), with methanol splitting off, to form the adduct [2]. The silicon is thus modified on the surface with epoxide groups. The adduct [2] itself reacts with polymers such as PET or PC, which have carboxyl groups on the surface, to create the adduct [3], with which the Si semiconductor is covalently bonded to the polymer matrix. Carboxyl group-modified PC is known from the prior art (for instance U.S. Pat. No. 4,959,411A).

A personal document having a chip is thus created in the manner described, and the chip forms an integral component of the document and is practically impossible to remove from the document structure.

TABLE 1

| A | B | C |
|---|---|---|
| —H<br>—OCH$_3$<br>—O—CH$_2$—CH$_3$ | CH$_2$<br>—CH=CH—<br>—O—(CH$_2$)$_n$— | —CH$_3$<br>—CH=CH$_2$<br> |
| —O—CH$_2$—CH$_2$—O—CH$_3$ | —(CH$_2$)$_n$—NH— |  |
| —F |  | —SH |
| —Cl |  | —NH$_2$ |
| —Br<br>—I<br>—CN<br>—(CH$_2$)$_n$—SH<br>—N$_2^+$ | —(CH$_2$)$_n$—COO—<br>—(CH$_2$)$_n$—CONH— | —COOH<br>—OH<br>—F<br>—Cl<br>—Br<br>—I<br>—CN |

TABLE 1-continued

| A | B | C |
|---|---|---|
|  |  | —OCN |
|  |  | —NCO |
|  |  | —NCS |
|  |  | —SCN |
|  |  | —$N_2^+$ |
|  |  |  |
|  |  |  |
|  |  | —$S_x$ |
|  |  | —CHO |

The invention claimed is:

1. A personal document having an integrated readable chip that can be read in a contactless manner, comprising:
   a laminate that comprises at least one chip film including a chip having a thickness of d≦50 μm, a substrate covering the chip film on a structural side of the chip, and a cover layer covering the chip film on a back side of the chip, the chip including an integrated circuit; wherein
   the chip film comprises the chip and polymer carrier film layers that, except for contact connectors of the chip, are applied to the structural side of the chip and to the back side of the chip;
   the chip is joined on each of the structural side and the back side of the chip to the polymer carrier film layers by a coupling reagent possessing a first chemical functional group that reacts with a semiconductor material on a surface of the chip to form a covalent bond therewith, and which coupling reagent possess a second chemical functional group that reacts with a polymer matrix of the polymer carrier film layers;
   the polymer carrier film layers, the substrate, and the cover layer each comprise compatible polymers that are miscible with one another; and
   the chip is joined to an antenna provided on the substrate.

2. The personal document of claim 1 further comprising first and second light protective layers respectively positioned on each of the structural side and the back side of the chip, whereby the first and second light protective layers protect the chip from damage caused by light.

3. The personal document of claim 1 wherein the polymer carrier film layers, the substrate, and the cover layer are further comprised of compatible polymers selected from the group of polycarbonates, polyethylene terephthalates, and derivatives of same.

4. The personal document of claim 1, wherein the polymer carrier film layers, the substrate, and the cover layer each comprise the same polymer.

5. The personal document of claim 1, wherein contractions of the polymer carrier film layers, the substrate, and the cover layer caused by molecular orientation are mutually compensating.

6. The personal document of claim 1, wherein thermal expansions of the polymer carrier film layers, the substrate, and the cover layer are mutually compensating.

7. The personal document of claim 1, wherein the polymer carrier film layers, the substrate, and the cover layer further comprise biaxially oriented polymer films.

8. The personal document of claim 1, wherein the antenna is further comprised of conductors terminating in ends, the conductors are printed on the substrate and are joined to the chip, and at least one of the conductors extends in a plane below the chip.

9. The personal document of claim 1, wherein the antenna is further comprised of conductors terminating in ends, the conductors are printed on the substrate and are joined to the chip, and at least one of the conductors has an interruption at the location of the chip, the interruption being connected internally to the chip.

10. The personal document of claim 1, wherein the polymer carrier film layers completely enclose the chip except for the chip contact connectors.

11. The personal document of claim 1, further comprising a passivation layer provided between at least one of the structural side and the back side of the chip and one of the polymer carrier film layers.

12. The personal document of claim 1, further comprising an electrically conductive layer having a thickness equal to or less than a thickness of at least one of the polymer carrier film layers, and wherein the electrically conductive layer is applied to the chip contact connectors.

13. The personal document of claim 12, wherein the electrically conductive layer comprises an intrinsically conductive polymer.

14. The personal document of claim 12, wherein the electrically conductive layer comprises a sinterable nanoscale metal powder.

15. The personal document of claim 12, wherein the electrically conductive layer comprises an adhesive including carbon nanotubes.

16. The personal document of claim 1, further comprising a filler structure provided on the substrate between ends of conductors of the antenna, the filler structure being joined to one of the polymer carrier film layers by lamination.

17. A method for producing a personal document that has as an integral component a chip comprising:
   a) producing a chip film by joining a structural side and a back side of a chip having a thickness of d≦50 μm to polymer carrier film layers with a coupling reagent possessing a first chemical functional group that reacts with a semiconductor material on a surface of the chip and forms a covalent bond therewith and possessing a second functional group that reacts with a polymer matrix of the polymer carrier film layers;

b) applying the chip film to a substrate formed of a polymer compatible with the chip film, the substrate being provided with an antenna structure;

c) laminating, with pressure and temperature, the chip film to the substrate, the antenna structure being provided with antenna connectors that become connected to the chip by the laminating;

d) laminating a cover layer over the chip film and the substrate, the cover layer being provided with a polymer compatible with the polymer carrier film layers comprising the chip film.

18. The method of claim 17, wherein the chip is joined to the carrier film by reacting the coupling reagent with the semiconductor material and the polymer carrier film layers; laminating the chip film to the substrate; and contacting the antenna connectors with the chip.

19. The method of claim 17, further comprising simultaneous laminating of the cover layer, the chip film, and the substrate.

20. The method of claim 17, further comprising arranging a polymer filler structure on the substrate in spaces between the antenna connectors.

21. The method of claim 17, further comprising stamping a depression on the substrate in a predetermined substrate location and positioning the chip in the depression.

22. The method of claim 17, further comprising applying a passivation layer to the chip prior to producing the chip film.

23. The method of claim 17, further comprising applying an electrically conductive material on exposed contact connectors of the chip prior to laminating the chip film to the substrate.

24. A method for producing a personal document that has as an integral component a chip comprising:

a) producing a chip film by joining a structural side and a back side of a chip having a thickness of d 50 μm to polymer carrier film layers with a coupling reagent possessing a first chemical functional group that reacts with a semiconductor material on a surface of the chip and forms a covalent bond therewith and possessing a second functional group that reacts with a polymer matrix of the polymer carrier film layers;

b) applying the chip film to a substrate comprising a polymer compatible with the chip film;

c) laminating, with pressure and temperature, the chip film to the substrate to form a laminate;

d) printing an antenna on the laminate to form an antenna containing laminate; and e) laminating a cover layer over the antenna containing laminate, the cover layer comprising a polymer compatible with the chip film.

25. The personal document of claim 1 wherein the chip further comprises a thickness of $d \leq 30$ μm.

26. The personal document of claim 1 wherein the chip further comprises a thickness of $d \leq 20$ μm.

27. The personal document of claim 1 wherein the polymer carrier film layers, the substrate, and the cover layer are each further comprised of compatible polymers that are soluble in one another.

28. The method of claim 17 wherein the chip further comprises a thickness of $d \leq 30$ μm.

29. The method of claim 17 wherein the chip further comprises a thickness of $d \leq 20$ μm.

30. The method of claim 24 wherein the chip further comprises a thickness of $d \leq 30$ μm.

31. The method of claim 24 wherein the chip further comprises a thickness of $d \leq 20$ μm.

* * * * *